United States Patent [19]

Rapp

[11] Patent Number: 4,882,194

[45] Date of Patent: Nov. 21, 1989

[54] LIQUID EGG COMPOSITIONS CONTAINING STORAGE-STABLE SOLIDS

[75] Inventor: Harold Rapp, Fairfield, Conn.

[73] Assignee: Nabisco Brands, Inc., East Hanover, N.J.

[21] Appl. No.: 115,552

[22] Filed: Oct. 29, 1987

Related U.S. Application Data

[63] Continuation of Ser. No. 846,473, Mar. 31, 1986, abandoned, which is a continuation of Ser. No. 568,365, Jan. 5, 1984, abandoned.

[51] Int. Cl.$^4$ .................. A23B 5/04; A23C 23/00; A23L 1/32
[52] U.S. Cl. .................. 426/614; 426/573; 426/575; 426/582
[58] Field of Search .................. 426/573, 575, 605

[56] References Cited

U.S. PATENT DOCUMENTS

| | | | |
|---|---|---|---|
| 3,293,044 | 12/1966 | Torr | 426/250 |
| 3,378,376 | 4/1968 | Seburg | 426/568 |
| 3,475,180 | 10/1969 | Jones | 426/614 |
| 3,635,733 | 1/1972 | Kichline et al. | 426/582 |
| 3,804,951 | 4/1974 | Rapp | 426/573 |
| 3,843,808 | 10/1974 | Ziccarelli | 426/187 |
| 3,911,144 | 10/1975 | Strong et al. | 426/588 |
| 3,962,483 | 6/1976 | Schulz | 426/582 |
| 4,080,477 | 3/1978 | Tsumura et al. | 426/656 |
| 4,200,663 | 4/1980 | Seeley et al. | 426/614 |
| 4,244,972 | 1/1981 | Johnson | 426/38 |
| 4,296,134 | 10/1981 | Boldt | 426/250 |
| 4,341,808 | 7/1982 | Croyle | 426/653 |
| 4,397,926 | 8/1983 | Galal et al. | 426/582 |

FOREIGN PATENT DOCUMENTS 2010066  6/1979  United Kingdom .

OTHER PUBLICATIONS

Meyer, A., "Eggs, and How to Use Them", published by Author, New York, 1898, pp. 112 and 113.

Mountney, G. J., "Poultry Products Technology", The AVI Publ. Co., Inc., Westport, Conn., 1976, pp. 320-321.

*Primary Examiner*—Donald E. Czaja
*Assistant Examiner*—Mary S. Mims
*Attorney, Agent, or Firm*—Richard Kornutik

[57] ABSTRACT

The present invention involves a liquid egg product combined with discrete moisture and melt stable cheese solid particles that may be cooked after extended storage to produce an egg dish having organoleptic properties that resemble such a dish prepared with fresh whole eggs and cheese. Preferably, the liquid egg product is low in cholesterol, saturated fats, and calories.

21 Claims, No Drawings

LIQUID EGG COMPOSITIONS CONTAINING STORAGE-STABLE SOLIDS

This application is a continuation of application Ser. No. 846,473, filed Mar. 31, 1986, which is a continuation of Ser. No. 568,365, filed Jan. 5, 1984 both abandoned.

FIELD OF THE INVENTION

This invention relates to liquid egg compositions containing storage stable solids, e.g., cheese or cheese analogs and more particularly, to such compositions also having reduced calorie and/or cholesterol content.

BACKGROUND OF THE INVENTION

Eggs are a valuable food product known as an important source of nutrients such as proteins, fats, vitamins and minerals. Eggs are also valued as a food for their distinctive flavor, mouthfeel and other organoleptic properties and as such are very desirable for eating by themselves.

The major parts of an egg are the shell composed mostly of calcium carbonate; the white composed mostly of proteins; and the yolk which is mostly a complex mixture of lipids and proteins. Mixtures of egg white and yolk are referred to as whole egg.

Liquid egg products, as the term is used herein, are processed compositions of egg white, yolk of whole egg, optionally including minor amounts of additives such as preservatives, stabilizers, texturizers, or the like. In the United States, egg products are processed to meet Government specifications relating to microbe content, chemical composition, and physical properties. Processing typically involves separating the white and yolks from their shells, pasteurizing and mixing the products thereof with lesser portions of additives. Separation of the shells from the white and yolk usually involves cooling the unbroken eggs to about 10° C., washing, rinsing, santizing, flash candling and thereafter breaking the shells and collecting the yolks and whites separately. Suitable pasteurization techniques are discussed in the *Encyclopedia of Chemical Technology*, Kirk-Othmer, John Wiley & Sons, Vol. 8, pp. 429–445; the text of which is incorporated herein by reference.

Findings implicating high blood cholesterol levels and high saturated fat intake in humans with the onset and/or severity of cardiovascular disease and public interest in low calorie diets has stimulated the development of modified egg products containing less cholesterol and saturated fat than products made with whole eggs. Whole egg contains about 548 mg cholesterol and 6.7 g of saturated fat per 100 g and all of these constituents are found in the yolk. See: *Composition of Foods, Dairy and Egg Products, Raw-Process-Dried*, Agriculture Handbook No. 8-1, Agriculture Research Service, U.S.-D.A. (1976). Modified liquid egg products having reduced levels of cholesterol and saturated fats may be prepared by removing at least some, and preferably all, of the yolk from the egg white and substituting additives that provide the white with organoleptic properties and coloring similar to whole eggs. The number of calories in such products may be reduced incidentally by the reduction of yolk content.

One example of such a modified egg product is disclosed in U.S. Pat. No. 3,911,144, which is incorporated herein by reference, and which discloses a substantially cholesterol free composition having a high degree of freeze/thaw stability comprising from about 24 to 99.5% wt. egg white and typically from about 0.005 to about 0.3% wt. xantham gum. Such egg products may be refrigerated or frozen and show little or no separation of their components when thawed. The thawed products have a viscosity similar to fresh whole eggs and when cooked, e.g., scrambled, produce a food having organoleptic properties smaller to fresh scrambled whole eggs.

Another example of a low cholesterol/reduced calorie modified egg product that stimulates fresh whole egg in cooked dishes is disclosed in U.S. Pat. No. 4,296,134, which is incorporated herein by reference, which product comprises about 60 to 96 parts by weight liquid egg white; 0 to 18 parts water; 2 to 15 parts of a protein replacement such as nonfat dry milk solids, powdered egg albumin and/or soy protein; and small quantities of stabilizer, flavoring, and coloring. These liquid egg products may be refrigerated or frozen for storage.

Consumer-oriented egg products and modified egg products for preparing popular egg dishes that have the organoleptic properties of fresh whole eggs are highly desirable for their economy, high nutrition, convenience, and appeal as a food. Moreover, egg product dishes which include discrete cheese portions or cheese-flavored particles, i.e. pieces, that are added to eggs before cooking to enhance and modify the natural egg flavors and provide discrete zones of natural or imitation cheese are also very desirable. The cheese solids included in such dishes may be particles of natural and/or synthetic cheese cut to a suitable size for incorporation into egg dishes, such as scrambled eggs, omelets or the like, and large enough to provide discrete regions of the melted cheese solids in the final cooked egg dish.

Egg recipes calling for cheese solids to be added to eggs before cooking are well known in the art, but it has heretofore been practical to add cheese solids to liquid egg products and modified liquid egg products that are to be refrigerated or frozen for substantial periods of time without undesirable softening and disintegration of the cheese particles that cause them to blend with the egg product and lose their structural identity so that they are no longer capable of forming discrete softened or melted cheese solids in cooked egg dishes prepared therefrom. In other words, such egg and cheese products are not storage stable under either refrigerator or freezer temperatures. Thus, the cooked egg dishes prepared from such products after storage have neither the appearance nor organoleptic properties of fresh scrambled eggs, or omelets, with cheese.

The major drawbacks to using many cheese solids in liquid egg products are that they rapidly liquify or melt and agglomerate on standing in the egg products and typically form a gooey mass that adheres to their containers or blends into the egg product. Therefore, when a cooked food such as scrambled eggs is prepared therefrom, the presence of the cheese solid will be unnoticeable in the cooked food, except for whatever it contributes to the overall flavor; or it may form one or a few undersirable large masses of sticky material in the product container or cooked food, e.g. it may lose the texture, consistency and mouthfeel of discrete melted cheese particles in the cooked food. When cheese solids are incorporated into egg products in accordance with the present invention, these drawbacks are avoided.

SUMMARY OF THE INVENTION

It is an object of the present invention to provide ready-to-cook, storage-stable, liquid egg products including cheese solids which retain their shape and do not agglomerate or disintegrate (liquify) when incorporated in liquid egg products for at least 7 days at refrigerator temperatures of about 32°-45° F. and, at least 3 months, preferably up to a year or more, when stored at conventional freezer temperatures of about −5° F. to 10° F., and which after storage form discrete regions or softened or melted cheese textured solids in cooked egg products prepared therefrom.

It is another object to provide storage and freeze/thaw stable ready-to-cook egg products with reduced cholesterol, saturated fats, and/or calories, i.e. modified egg products, including cheese solids that produce, even after extended periods of storage at freezer temperatures, a scrambled egg type egg dish with discrete cheese solid regions having organoleptic properties that closely resemble an omelet prepared from a fresh whole egg mixture including diced cheese pieces.

It is another object of the present invention to provide methods for preparing ready to cook egg and cheese products, including a liquid egg base and cheese solids that are storage stable for at least 7 days at refrigerator temperatures between about 32° F.-45° F. and, at least 3 months, preferably up to a year, or more at temperatures below 32° F., and after said storage period said products may be cooked to provide a cooked egg dish, e.g., a cheese omlet having discrete, melted or softened, textured cheese regions.

It is yet another object of the present invention to provide methods of preparing cooked egg dishes and products thereof from the liquid egg and cheese compositions of this invention.

In accordance with the foregoing objectives, the present invention provides ready-to-cook, storage-stable, egg and cheese compositions comprising a liquid egg base containing a plurality of discrete cheese solid particles; said particles having a moisture index of about 3 or less and a melt index of about 1 or less; wherein said cheese particles substantially retain their structural integrity during storage for at least 7 days at refrigerator temperatures.

A composition in accordance with the present invention comprises a liquid egg base containing a plurality of discrete cheese particles; and particles having a moisture index of about 3 or less and a melt index of about 1 or less; wherein said cheese particles substantially retain their structural integrity during storage at freezer temperatures.

This invention also provides methods of preparing ready-to-cook, storage-stable egg and cheese products comprising the steps of combining liquid egg base with a plurality of cheese solid particles; said particles having a melt index of about 1 or less and a moisture index less than about 3.

The cooked egg and cheese dishes of the present invention are prepared by mixing a liquid egg base with a plurality of cheese solid particles; said particles having a moisture index of about 3 or less and a melt index of about 1 or less, and heating the mixture until the egg protein coagulates forming a semi-solid mass having discrete melted cheese particles dispers therein.

DETAILED DESCRIPTION OF THE INVENTION

Ready to cook, storage stable egg and cheese products of the present invention may be prepared by adding cheese solids having a specified moisture index and melt index to a liquid egg base.

Liquid egg base may be whole egg or a processed egg composition derived from the whites and/or yolks of eggs. Such processed egg compositions may be prepared from egg whites and additives that impart desirable organoleptic properties such as flavor, mouthfeel, viscosity, and coloring etc. to the composition before and/or after cooking and may further include vitamins or other fortifiers, preservatives, and the like. Preferably, such processed egg compositions are based on egg whites and are comprised of about 20 to 100% by weight egg white, and more preferably 24 to 99.5% by weight egg white, plus texturizers and/or other additives mentioned herein.

Modified liquid egg products useful herein comprise from about 20 to 99.5% by weight liquid egg white and more preferably about 70-99.5%; 0 to about 1.0% by weight gum or mixtures thereof such as guar, xanthan, carrageenan, carboxymethyl cellulose, or the like; 0 to about 8% by weight nonfat dry milk solids; 0 to about 15% by weight oil such as corn oil, partially hydrogenated soybean oil, or the like; 0 to about 1.0% by weight of emulsifier; and 0 to about 3% by weight colorings, vitamins, flavorings, and the like. The precise quantities of the above ingredients used in a particular modified egg product are selected, insofar as possible, to restore the organoleptic properties and coloring of whole egg lost by elimination of the yolks without significantly increasing the cholesterol and saturated fat concentrations; and further to impart a viscosity similar to that of whole egg and freeze/thaw stability, i.e., the tendency of the modified egg product to separate into distinct layers while being thawed from the frozen state. Such products are commercially available, e.g., the Nabisco Brands, Inc. Egg Beaters—type products.

The above mentioned gums, particularly guar, xanthan, carrageenans and carboxymethyl cellulose, advantageously modify the viscosity and freeze/thaw stability of the modified egg products. These gums are available from various commercial suppliers such as Hercules Inc., FMC Corp. and Kelco Co., and are preferably used in the present egg compositions to the extent of about 0.1-0.5%.

The nonfat dry milk solids and like materials optionally employed in the above-described modified egg products are desirable as an additional source of protein and may improve the texture of cooked egg products and reduce the separation of water therefrom. Preferably about 0.5-5% of nonfat dry milk solids will be employed in the present liquid egg products.

The above mentioned oil in part replaces the oils naturally present in the eliminated egg yolk. Vegetable oils such as corn, cottonseed, soybean, safflower, sunflower, peanut, rape seed, olive, and sesame oils and mixtures thereof are preferred because they contain less saturated fats and cholesterol than other usable oils. Preferably about 7.5-12% of vegetable oil will be used in the egg products useful in the present invention. Corn oil is particularly preferred. The oil may also be useful for dispersing oil soluble colorings in the modified egg product.

The emulsifier, optionally employed, in the above-described modified liquid egg product, e.g. lecithin, or another food-compatible synthetic or natural emulsifier, is principally useful for preventing the modified egg product from sticking to the vessel in which it is cooked. Of the synthetic emulsifiers, polyoxy (lower) alkylene mono- and di-glycerides are preferred. The total emulsifier will preferably comprise about 0.25–0.75% by weight of the liquid egg product. Emulsifiers also may influence the texture and homogeneity of the modified egg product both before and after cooking. Lecithin is a preferred emulsifier because it is a natural component of egg yolk.

A useful low cholesterol modified egg product may be prepared as follows:

A suitable vessel is charged with 3,264 pounds of liquid egg white, then 71 pounds of corn oil is added at 32° to 45° F. These ingredients ae thoroughly mixed.

A mixture of dry ingredients is prepared by blending the following ingredients 6.39 pounds of carboxymethyl cellulose, 1.97 pounds of xanthan gum, 0.3 pounds of anhydrous aluminum sulfate, 0.17 pounds of ferric orthophosphate, 0.0044 pounds of thiamine mononitrate, 0.0044 pounds of riboflavin and 28.5 pounds of nonfat dry milk and the blended mixture is then added to the previously combined materials with thorough mixing. An additional 329 pounds of corn oil is then added to this mixture, at ambient temperature, with agitation to produce a base mixture.

A premix is prepared in a separate vessel as follows: 75 pounds of corn oil is heated to from 130° to 150° F. and then 11.7 pounds of lecithin and 10 pounds of Myvatex 3-50 (a blend of mono- and diglycerides and propylene glycol manufactured by D.P.I. Div. Eastman Chemical Products Co.) are added with mixing. After mixing for 10 to 15 minutes, a small amount of a flavoring agent and a mixture comprising 0.157 pounds of PIGMENTENE Yellow-Gold (an extract of plant xanthophylls available from Special Nutrients, Inc. Surfside, Fla.), 0.11 pounds of a 30 percent dispersion of beta-carotene, and 0.00232 pounds of vitamin D in oil is added and thoroughly mixed. This hot premix is then added to the base mixture with blending.

Thereafter the total ingredients mix is pasteurized by heating at a temperature of about 136° F. for about 5 minutes and then passed through a Manton-Gaulin two-stage homogenizer, the first stage being at 1000 psi and the second stage being at 500 psi. The homogenized product is then tested to confirm that it has an appearance and organoleptic properties similar to fresh whole eggs in both the cooked and uncooked states.

Cheese solids suitable for use in the present invention include natural and synthetic cheeses of any variety such as cheddar, swiss, mozzarella or the like, having a melt index less than about 1 and a moisture index of less than about 3, as explained in greater detail below. An example of a natural commercial cheese products with the above properties in Kraft Hi-Melt Swiss available from Kraft, Inc., Memphis, Tenn. An example of a commercially available synthetic cheese with the above properties is American Cheese Substitute available from Schreiber Foods, Inc., Green Bay, Wis.

The cheese solids useful in the present invention have a melt index of about 1 or less and a moisture index less than about 3, so that particles thereof will not lose their structural identity nor degrade in less than 72 hours when stored in water at 40° F., as determined by tests set forth in greater detail below and may derived from be commercially-available natural or synthetic cheeses such as swiss, cheddar, mozzarella, or the like. Cheese solids having the requisite melt index and moisture index will contain about 30–45% by weight water, about 15–25% by weight fat, 15–25% by weight protein, 0–5% by weight salt, and minor amounts of other ingredients such as colorants, flavorings, vitamins, and other cheese compatible ingredients.

So long as the cheese solids have the requisite melt index and moisture index the cheese particles may also be prepared from about 30–40% by weight water, about 15–20% by weight casein, about 15–20% by weight oil, as hereinabove described, preferably partially hydrogenated soybean oil, about 0–15% by weight natural cheese, about 0–10% by weight whey, about 1–5% by weight skim milk, about 0–5% by weight salt, about 0–5% by weight enzyme modified cheese, about 0–0.3% by weight antimicrobial agent such as sorbic acid or its calcium, potassium and sodium salts, about 0–1% by weight disodium phosphate, a sufficient quantity of acid such as lactic acid to adjust the pH of the mixture to about 6 or less; a sufficient quantity of one or more mineral emulsifiers to adjust the melt index of the finished cheese solid to about 1 or less, such as sodium hexametaphosphate or tetrasodium pyrophosphate, and about 0–10% additional flavoring and coloring. An exemplary cheese formulation is:

| Ingredients | % By Weight |
|---|---|
| Casein | 18.0 |
| Partially Hydrogenated Soybean Oil | 18.0 |
| Whey (Reduced Lactate) | 5.0 |
| Skim Milk | 4.8 |
| Sodium Hexametaphosphate | 2.5 |
| Lactic Acid | .7 |
| Salt | 2.5 |
| Swiss Cheese (natural) | 10.0 |
| Enzyme Modified Cheese | 2.5 |
| Di-sodium Phosphate | 0.5 |
| Sorbic Acid | 0.2 |
| Artificial Coloring and Flavoring | 0.1 |
| Water | 35.2 |

The suitability of a cheese solid, for use in the products of the present invention is determined by its moisture index and melt index. A moisture stable cheese solid has the requisite melt index of about one or less and a ¼ inch cube thereof can be placed in 180 cc of deionized water for 72 hours at a temperature of 40° F. and the cube does not disintegrate into a melted mass but substantially retains its cubical shape.

Moisture index may be determined by placing 60 gms. of ¼ cubic inch cheese solid cubes in 180 g of deionized water in a 400 ml covered beaker for three days (72 hrs) under refrigeration at about 40° F. If after the three days the water is milky, and the cheese solid cubes have rounded edges and are stuck together but not melted into a solid mass, the cheese solid has an acceptable moisture index (less than about 3) for purposes of the present invention. In contrast, if the water has become very cloudy (milky) and the cheese solid cubes have lost their shape, e.g., edges are severely rounded forming a sticky melted mass (agglomeration), they will not be useful in making the storage stable egg and cheese compositions of the present invention. Moisture test results are quantitated using the following table:

TABLE I

| Moisture Index | Appearance | Cube Consistency |
|---|---|---|
| (1) | Water - clear to slightly milky | Firm body (Hard) |
| | Cubes - well-defined, sharp edges | Surface not sticky<br>No tendency for cubes to stick together |
| (2) | Water - milky | Firm to slightly firm body |
| | Cubes - slightly rounded edges | Surface may have slight layer of soft cheese<br>No tendency for cubes to stick together |
| (3)<br>(Boarder-line Accepta-bility) | Water - milky<br>Cubes - rounded edges, some "melted" appearing cheese may be visible | Soft to sticky<br>Large numbers of cubes stuck together but not melted into a mass |
| (4) | Water - very milky, may have dissolved cheese layer floating on surface | Very sticky<br>Difficult to identify cubes or to separate them |
| | Cubes - severely rounded edges; "melted" appearance | Cheese has formed a large "melted" mass |

As indicated in Table I above, cheese solids having a moisture index less than about 3 are suitable for purposes of the present invention and are sometimes referred to herein as moisture-stable cheese solids.

Melt index criteria for cheese solids suitable for use in the present invention is measured by a melt test wherein a cheese solid disc 4.76 mm thick and 39.5 mm in diameter is placed in the center of a covered petri dish and heated to 450° F. for five minutes. The melted cheese solid is then cooled for thirty minutes centered over a measuring device for determining its melt index. The measuring device comprises a series of numbered concentric circles having diameters incrementally increasing by 6.5 mm. The center circle is numbered 1 and has a diameter of 40 mm; the next circle, moving outwardly, is numbered 2 and has a diameter of 46.5 mm and the remaining circles 3–11 are similarly arranged. A test sample's melt index is measured by determining the largest circle that the melted sample touches and assigning a melt index corresponding to the number of that circle. If a melted cheese solid displays a melt index greater than about 1, it is not acceptable.

Cheese solids having acceptable melt test and moisture index characteristics may be incorporated into the above-described modified egg product or other egg products and then aseptically packaged, for example, in 8.5 oz. containers, or the like, so that substantially equivalent quantities of cheese solids is put in each container.

An egg and cheese, storage-stable product in accordance with the present invention may be prepared by cutting or dicing a cheese solid loaf, said cheese having a moisture index of about 3 or less and a melt index of about 1 or less, into small pieces, e.g., 1/16–⅜ inch cubes and combining the cubes with a liquid egg base as described above. Cubes of about ¼ cubic inch are preferred because such cubes are more or less uniformly dispersed in liquid egg bases having a viscosity similar to whole egg when shaken or mixed. Thus aliquots of an egg and cheese product that contain about the same proportion of cheese solid particles as present in the whole can be readily obtained.

The proportion of cheese solid to egg base in the egg and cheese products of the invention may be varied as desired to obtain selected cooked egg dishes therefrom. However, egg and cheese products having about 10 to 45%, preferably about 25%, by weight cheese solids are preferred because they may be cooked to provide products that closely resemble conventional cheese omelets.

A cooked egg and cheese product such as an omelet in accordance with the present invention may be prepared by melting approximately 12 g of margarine until it bubbles and coats a suitable cooking vessel such as an 8 inch skillet and then adding about 240 g of an egg and cheese product prepared in accordance with the foregoing disclosure, cooking is continued in the vessel until a semi-solid mass is formed, the semi-solid mass may then be folded into the familiar omelet (crescent) shape and turned to insure equal cooking and if desired slight browning on both sides. The resulting cooked egg product closely resembles a conventional cheese omelet prepared with whole eggs.

EXAMPLE I

Liquid Egg Base

Another liquid egg base useful in the present invention is prepared by combining the following ingredients:

| Ingredients | % by weight |
|---|---|
| Liquid Egg White | 98.50 |
| Water | 0.50 |
| Corn Oil | 0.28 |
| Xanthan Gum | 0.12 |
| Guar Gum | 0.07 |
| Carrageenan | 0.02 |
| Vitamin/Mineral Premix | 0.35 |
| Colorings | 0.16 |

The mixed ingredients are pasteurized by heating to a temperature of 136° F. for about 5 minutes and then homogenized by passing the mixture through a Manton-Gaulin two-stage homogenizer, the first stage being at 1000 psi and the second stage being at 500 psi. The homogenized liquid egg is then tested by well known methods which confirm that it has the organoleptic properties and coloring of whole eggs in both the cooked and uncooked states.

EXAMPLE II

A ready-to-cook egg and cheese product is prepared by dicing Kraft High Melt Swiss cheese into ¼ inch cubes and placing 2 oz. portions thereof in suitable containers. Approximately 6 oz. of the liquid egg base, prepared in Example I above, is then added to the container to form the egg and cheese product.

It is possible to store this egg and cheese product for at least 3 months and preferably a year or more at freezer temperatures and at least 7 days at temperatures less than about 45° F., without loss of the product's functional characteristics; that is, the product can be thawed, if necessary, and cooked to produce an omelet that closely resembles a fresh omelet prepared with whole egg and cheese.

EXAMPLE III

A ready-to-cook egg and cheese product is prepared by dicing Schreiber's American Cheese Substitute into ¼ inch cubes and placing 2 oz. portions thereof in a suitable containers. Approximately 6 oz. of the liquid egg base, prepared in Example I above, is then added to the container to form the egg and cheese product.

It is possible to store this egg and cheese product for at least 3 months and preferably a year or more at freezer temperatures and at least 7 days at temperatures less than about 45° F., without loss of the product's functional caracteristics; that is, the product can be thawed, if necessary and cooked to produce an omelet that closely resembles a fresh omelet prepared with whole egg and cheese.

EXAMPLE IV

One 8.0 oz. container of the egg and cheese product prepared in Example III which has been stored for more than 7 days at refrigerator or freezer temperatures is shaken well and would be thawed if necessary. The shaken egg and cheese product is poured into a greased heated 8 inch skillet and cooked to a semi-solid mass for about 3 minutes with periodic gentle agitation. Then the semi-solid mass is folded into a crescent and slightly browned on both sides. The resulting cooked egg dish has an appearance and organoleptic properties similar to an omelet prepared with fresh whole egg including discrete pieces of melted cheese.

The terms and expressions which have been employed herein are used as terms of description and not of limitation. It is not intended, in the use of such terms and expressions, to exclude any equivalents of the features shown and described or portions thereof, since it is recognized that various modifications are possible within the scope of the invention and appended claims.

What is claimed is:

1. A method for preparing and storing in a stable condition a liquid egg composition containing a multiplicity of discrete solid cheese pieces, which composition provides after storage for a least one week, a liquid egg base containing discrete solid pieces of cheese comprising:
   a. preparing a cookable, storage-stable liquid egg composition comprising about 20% to 100% by weight egg white, 0 to about 1% by weight gum, 0 to about 10% by weight nonfat dry milk solids, 0 to about 15% by weight oil, and 0 to about 5% by weight colorant;
   b. adding a multiplicity of discrete solid cheese pieces to said liquid egg composition, said cheese pieces having a moisture index of about 3 or less and a melt index of about 1 or less and said cheese pieces comprising about 30-45% by weight water, about 15-25% by weight fat, about 15-25% by weight protein and about 0-5% by weight salt;
   c. cooling said composition prepared in accordance with steps (a) and (b) to refrigerator temperatures and maintaining said composition at said temperature for at least about 7 days, and;
   d. removing said egg and cheese composition from said refrigerator temperatures, to provide a liquid egg base containing discrete solid pieces of said cheese, wherein said liquid egg base is cookable to a food product comprised of cooked egg having discrete softened or melted cheese disposed therein.

2. A method for preparing and storing in a stable condition a liquid egg base and cheese containing composition, which composition provides after storage at freezer temperatures for at least three months a liquid egg composition containing discrete cheese pieces having structural integrity in the liquid egg base comprising:
   a. preparing a cookable, storage-stable composition by mixing together discrete solid cheese pieces with a liquid egg base wherein said liquid egg base is comprised of about 20% to 100% by weight egg white, wherein said cheese pieces have a moisture index of about 3 or less and a melt index of about 1 or less, and wherein said cheese pieces comprise about 30-45% by weight water, about 15-25% by weight fat, about 15-25% by weight protein and about 0-5% by weight salt,
   b. maintaining said product of step (a) in a frozen condition at freezer temperatures for at least about three months, and then thawing said composition to provide said liquid egg base containing said discrete pieces of cheese.

3. The method according to claim 2 wherein the thawed product of claim 27 is cooked to provide a product comprised of cooked egg having discrete softened or melted cheese disposed therein.

4. The method according to claim 2 wherein the liquid egg base includes a gum.

5. The method according to claim 2 wherein the liquid egg base comprises about 20 to 99.5% by weight egg white; 0 to about 1% by weight gum, 0 to about 10% by weight nonfat dry milk solids; 0 to about 15% by weight oil; and 0 to about 5% by weight colorant, vitamins and flavorings.

6. The method according to claim 5 wherein the gum is selected from the group consisting of xanthan, carrageenan, guar, carboxymethyl cellulose and mixtures thereof; the oil is selected from the group consisting of vegetable, corn, cottonseed, sesame, partially hydrogenated soybean, and mixtures thereof; and said liquid egg base includes an emulisifier which is comprised of lecithin.

7. The method according to claim 6 wherein the cheese solid comprises about 30-40% by weight water, about 15-20% by weight casein; about 15-20% by weight oil; about 0-15% by weight natural cheese; about 0-10% by weight whey; about 1-5% by weight skim milk; about 0-5% by weight salt; about 0-5% by weight enzyme modified cheese; about 0-0.3% by weight antimicrobial agent; about 0-1% by weight disodium phosphate; sufficient acid to adjust the pH of the cheese solid to about 6 or less; a sufficient quantity of mineral emulsifier to adjust the melt index of the cheese solid to about 1 or less; and about 0-10% by weight additional flavoring and coloring.

8. The method according to claim 7 wherein the mineral emulsifier is selected from the group consisting of sodium hexamethaphosphate and tetrasodium pyrophosphate.

9. The method according to claim 2 wherein each cheese solid particle has dimensions of about a 1/16 to ⅜ inch cube.

10. The method according to claim 9 wherein the cheese solids comprise between about 10 and 45% by weight of the egg and cheese composition.

11. The method according to claim 1 wherein said liquid egg base is comprised of a low cholesterol, reduced calorie egg product comprised by weight of about 60 to 96 parts egg white, 0 to 18 parts water, 2 to 15 parts protein and minor effective amounts of stabilizer, flavoring and coloring.

12. The method according to claim 11 wherein said protein is selected from the group consisting of nonfat dry milk solids, powdered egg albumin and soy protein.

13. The method according to claim 2 wherein said liquid egg base is comprised of a low cholesterol, reduced calorie egg product comprised by weight of about 60 to 96 parts egg white, 0 to 18 parts water, 2 to 15 parts protein and minor effective amounts of stabilizer, flavoring and coloring.

14. The method according to claim 13 wherein said protein is selected from the group consisting of nonfat dry milk solids, powdered egg albumin and soy protein.

15. The method according to claim 2 wherein said cheese comprises by weight about 18% casein, 18% partially hydrogenated soybean oil, 5% whey, 4.8% skim milk, 2.5% lactic acid, 2.5% salt, 10% swiss cheese, 2.5% enzyme modified cheese, 0.5% disodium phosphate, 0.2% sorbic acid and 35% water.

16. The method according to claim 3 wherein said cheese comprises by weight about 18% casein, 18% partially hydrogenated soybean oil, 5% whey, 4.8% skim milk, 2.5% lactic acid, 2.5% salt, 10% swiss cheese, 2.5% enzyme modified cheese, 0.5% disodium phosphate, 0.2% sorbic acid and 35% water.

17. The method according to claim 1 wherein following said refrigeration said liquid egg and cheese product is cooked to provide a cooked egg product having discrete cheese pieces disposed therein.

18. The method according to claim 1 wherein the gum is selected from the group consisting of xanthan, carrageenan, guar, carboxymethyl cellulose and mixtures thereof; the oil is selected from the group consisting of vegetable, corn, cottonseed, sesame, partially hydrogenated soybean, and mixtures thereof; and said liquid egg composition includes an emulsifier which is comprised of lecithin.

19. The method according to claim 18 wherein the solid cheese pieces comprise about 30-40% by weight water; about 15-20% by weight casein; about 15-20% by weight oil; about 0-15% by weight natural cheese; about 0-10% by weight whey; about 1-5% by weight skim milk; about 0-5% by weight salt; about 0-5% by weight enzyme modified cheese; about 0-0.3% by weight antimicrobial agent; about 0-1% by weight disodium phosphate; sufficient acid to adjust the pH of the cheese solid to about 6 or less; a sufficient quantity of mineral emulsifier to adjust the melt index of the cheese solid to about 1 or less; and about 0-10% by weight additional flavoring and coloring.

20. The method according to claim 1 wherein the solid cheese pieces comprise between about 10 to 45% by weight of the egg and cheese composition and wherein the cheese pieces have the dimension of about a 1/16 to ⅜ inch cube.

21. The method according to claim 1 wherein said cheese pieces comprise by weight about 18% casein, 18% partially hydrogenated soybean oil, 5% whey, 4.8% skim milk, 2.5% lactic acid, 2.5% salt, 10% swiss cheese, 2.5% enzyme modified cheese, 0.5% disodium phosphate, 0.2% sorbic acid and 35% water.

* * * * *